June 11, 1935.  G. E. BLOOD  2,004,234
AUTOMATIC DISCHARGE AND WATER CONTROL FOR CONCRETE PAVERS
Filed Sept. 3, 1931  7 Sheets-Sheet 1

Inventor
GEORGE E. BLOOD
By Parker Cook
Attorney

June 11, 1935. G. E. BLOOD 2,004,234
AUTOMATIC DISCHARGE AND WATER CONTROL FOR CONCRETE PAVERS
Filed Sept. 3, 1931 7 Sheets-Sheet 3

Inventor
GEORGE E. BLOOD
By Parker Cook
Attorney

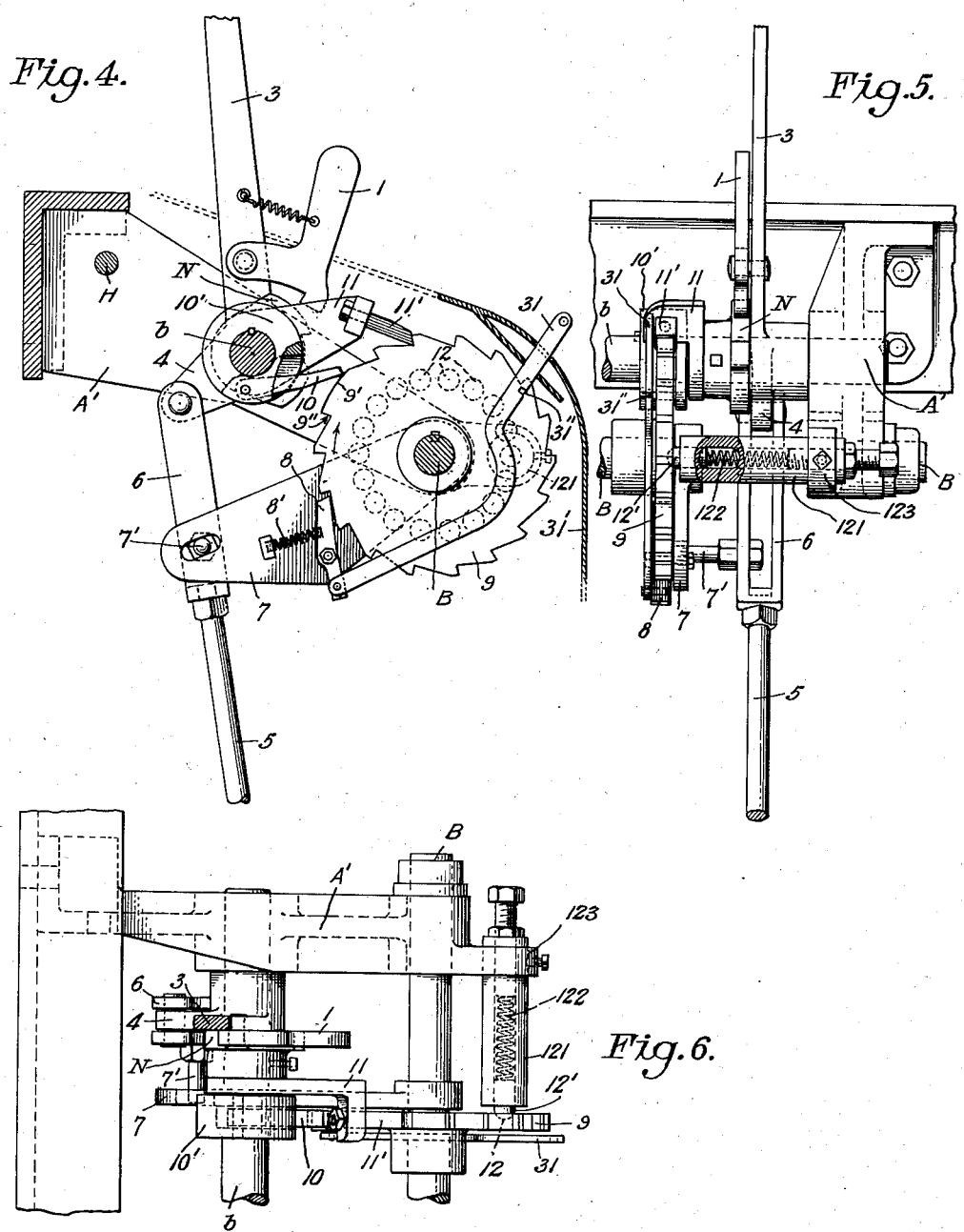

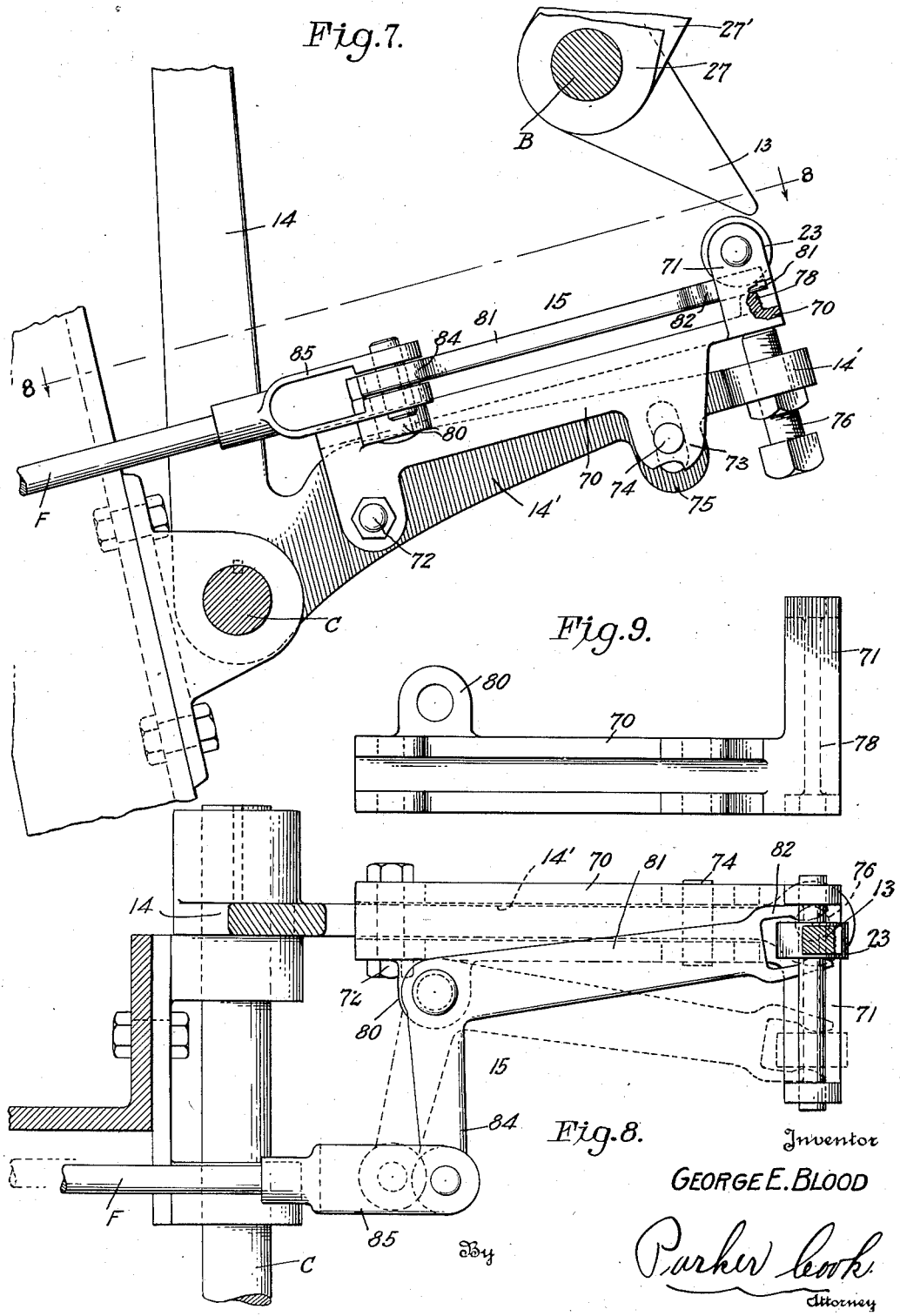

June 11, 1935.  G. E. BLOOD  2,004,234
AUTOMATIC DISCHARGE AND WATER CONTROL FOR CONCRETE PAVERS
Filed Sept. 3, 1931    7 Sheets-Sheet 6
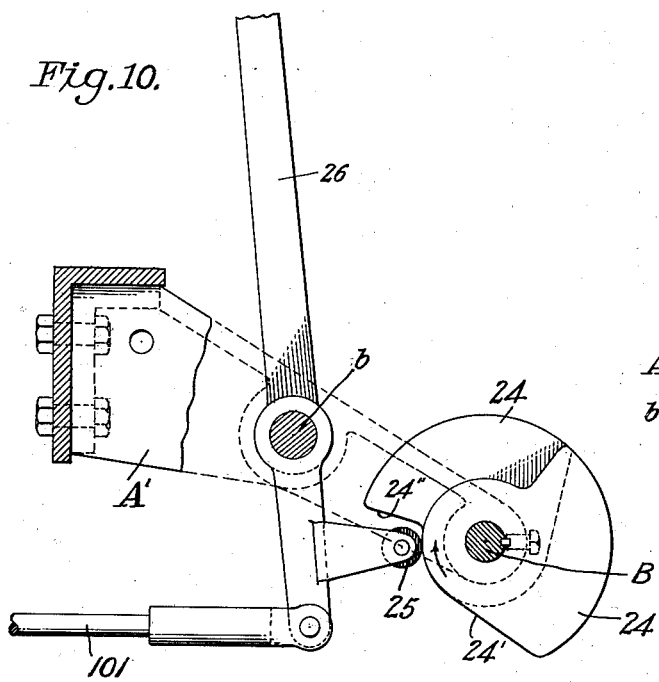
Fig.10.
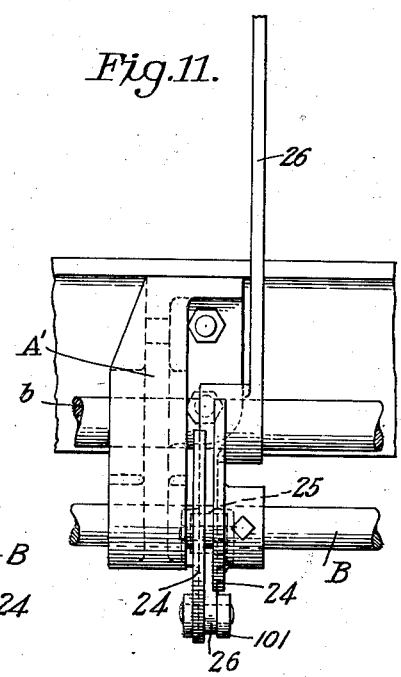
Fig.11.
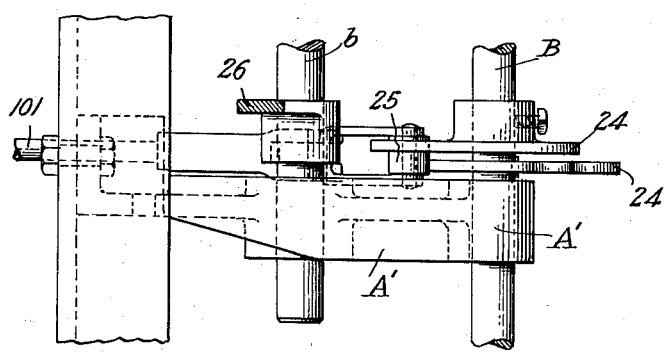
Fig.12.
Fig.13.
Inventor
GEORGE E. BLOOD
By Parker Cook.
Attorney

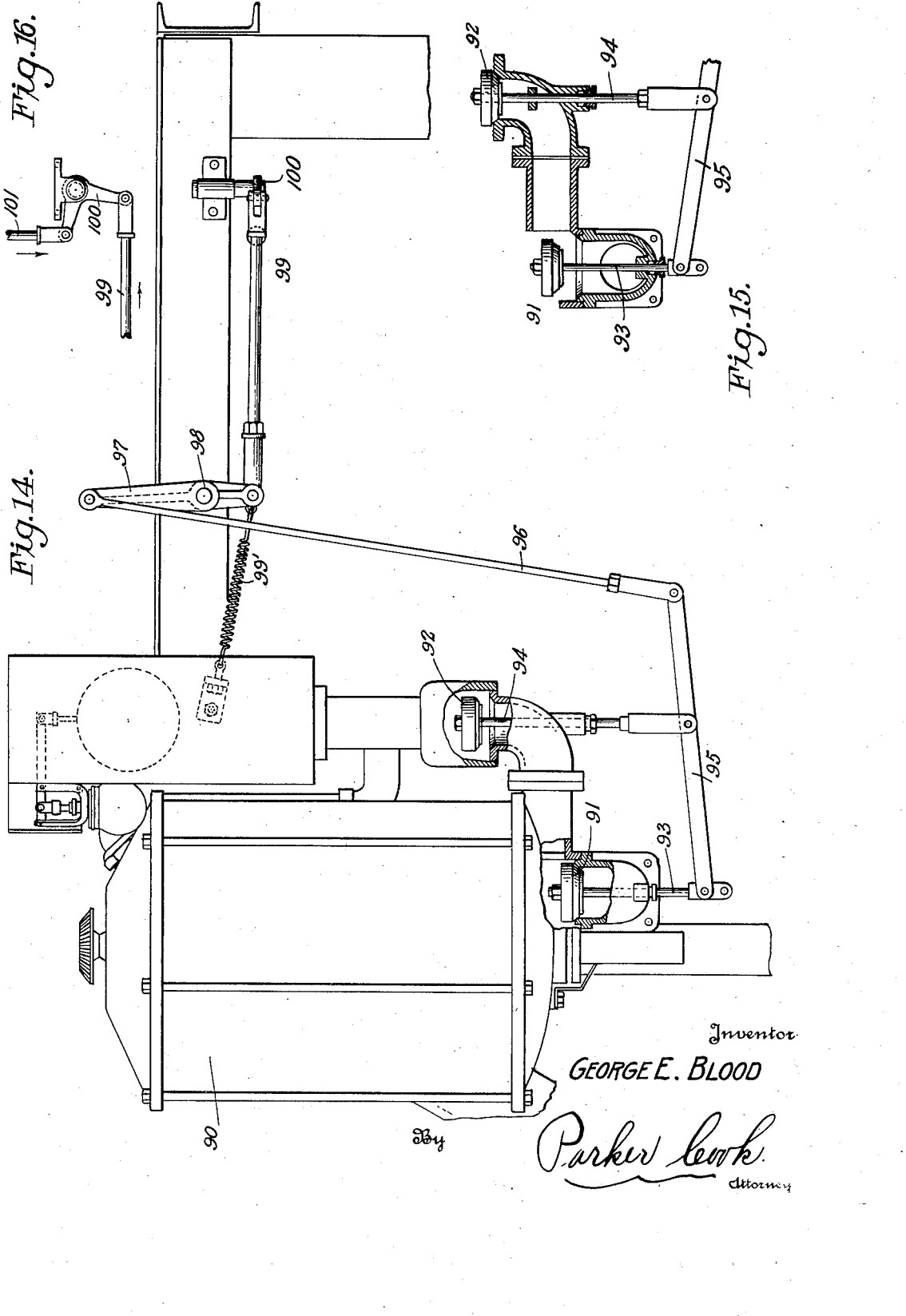

Patented June 11, 1935

2,004,234

UNITED STATES PATENT OFFICE 2,004,234

AUTOMATIC DISCHARGE AND WATER CONTROL FOR CONCRETE PAVERS

George E. Blood, Nunda, N. Y., assignor to The Foote Company, Inc., Nunda, N. Y., a corporation of Delaware Application September 3, 1931, Serial No. 561,073

20 Claims. (Cl. 83—73)

My invention relates to new and useful improvements in automatic discharge and water control mechanism for concrete pavers, and has for an object to provide positive control mechanism whereby, when the operator moves the handle for the operation of the skip hoist, the automatic control mechanism will be started, so that the power operated discharge will be set into operation to release the batch that has been previously placed in the drum. Then, after a timed interval, the power operated discharge will automatically close. Furthermore, the inlet or replenishing valve for the water tank on the paver will be cut off, and the tank contents will be emptied into the drum of the paver, so that the aggregates may be properly mixed for the delivery of the mixed batch, this occurring just as the aggregates leave the skip and enter the drum of the paver.

Still another object of the invention is to provide an automatic mechanism whereby, after the batch meter bell rings and the power discharge mechanism is automatically unlocked by the batch meter, the operator on starting the skip in its upward travel, will also have set into motion the automatic control mechanism, so that the power operated discharge will automatically open to discharge a batch into the bucket, and, after a pre-determined time, say seven seconds, will automatically close without further manual operation by the operator, the requisite amount of water having also been fed into the drum, and automatically cut off after a pre-determined time.

After the skip is lowered and again started on its upward movement, the cycle will be again started.

Still another object of the invention is to provide an automatic discharge mechanism and water control whereby these operations will be automatic with the manual control of the skip hoist; that is, when the skip is started on its upward journey, the timing control will be set in operation and the cycle completed.

Still another object of the invention is to provide a device whereby the automatic discharge mechanism is assumed to be closed, and the cycle started when the skip has started its upward journey, but, if the discharge is open when the automatic mechanism is thrown into operation, the cycle will operate just the same with the exception that the discharge will stay open until closed by a closing cam, after which the cycle of operations will take place in their regular order.

Still another object of the invention is to apply the automatic mechanism about to be described to the well known form of planetary discharge used on all of the Foote pavers, which planetary discharge is shown and described in the patent granted to Charles E. Foote on November 10, 1925, and numbered 1,561,144.

In the patent mentioned, the planetary mechanism for operating the discharge chute is located on one side of the machine, whereas in the present instance the planetary mechanism is located directly over the discharge chute.

It will be understood that when the words—"power discharge"—or—"power operated discharge"—are used, they refer to a chute that fits in the drum of the paver that is to be partly revolved to an open or discharging position for the drum, and revolved to a closed or a non-discharging position, the revolving being done by a planetary mechanism as shown in the above referred to patent.

Still another object of the invention is to provide an automatic control mechanism for operating the water discharge. In the present instance this automatic mechanism is shown for controlling the form of water measuring tank, as shown in a pending application filed by me on May 17, 1930, and bearing Serial Number 453,282 and, which has matured into Patent 1,879,051, September 27, 1932. In that application the water tank is manually operated to open and close the water supply, whereas in the present case, this is automatically controlled, but still may be manually controlled if desired.

Still another object of the invention is to provide an automatic power-operated discharge and water control mechanism that may be quickly and readily applied to the well known form of Foote paver, with its equally as well known form of planetary power discharge, and its measuring water supply tank.

Still another object of the invention is to provide an automatic discharge and water control, wherein the interval of time for the remaining open of the discharge may be regulated for, say, either seven, nine or eleven seconds, as a batch from the drum can be easily discharged into the bucket in these few seconds. Also, the releasing of the water from the tank may be properly timed with relation to the emptying of the skip into the drum, and this is generally done just as the aggregates leave the skip and enter the drum. Again, the timing of the discharge of the water from the tank into the drum may also be regulated.

Still another object of the invention is to provide an automatic controlling mechanism for opening and closing the power discharge and for operating the valves of the water tank, which mechanism is easily adjustable and may be readily and quickly applied to the Foote paver with but slight changes; the automatic mechanism in no way interfering with the ordinary manual operation of the power discharge or the manual operation of the water supply tank.
With these and numerous other objects in view, the invention consists in certain new and novel arrangements and combination of parts as will be hereinafter more fully explained and pointed out in the claims.
Referring now more particularly to the drawings showing a preferred embodiment, Fig. 1 is a side elevation showing a fragmentary part of the frame of a concrete paver with my improved automatic discharge and water control mechanism as attached thereto, the automatic timing mechanism about to start its cycle, the power operated planetary discharge for the drum, however, having been just operated as if the cam 13 were in its dotted line position.
Fig. 2 is a face view thereof.

Fig. 4 is a detailed sectional view, taken on line 4—4 of Fig. 2, showing the conjoint means for starting and operating the timing shaft and for controlling the operation of the skip hoist.

Fig. 5 is a face view of the same.

Fig. 6 is a plan view of the same.
Fig. 7 is an enlarged detailed sectional view, taken on line 7—7 of Fig. 2, showing the manual and automatic means for operating and resetting the power operated planetary discharge mechanism.
Fig. 8 is a sectional plan view of the same, taken on line 8—8 of Fig. 7.

Fig. 9 is an inverted view of the roller carrying member shown in Figs. 7 and 8.

Fig. 10 is an enlarged detailed sectional view, taken on line 10—10 of Fig. 2, showing the water control mechanism cams.

Fig. 11 is a face view of the same.

Fig. 12 is a top plan view of the same.

Fig. 13 is a detailed view of the water control lever.

Fig. 14 is a side elevation of the water measuring tank, the replenishing valve being shown open and the discharge valve being shown closed.

Fig. 15 is a detailed view of the discharge and replenishing valves, the replenish valve being closed and the discharge valve being open.

Fig. 16 is a detail of the bell crank lever in the control line between the water control lever and the valve operating means of the measuring tank.
The attachment about to be described is designed to be used with the heretofore mentioned type of Foote paver, although it might be applied to other forms of pavers now in use.

*General description*

Figure 1:
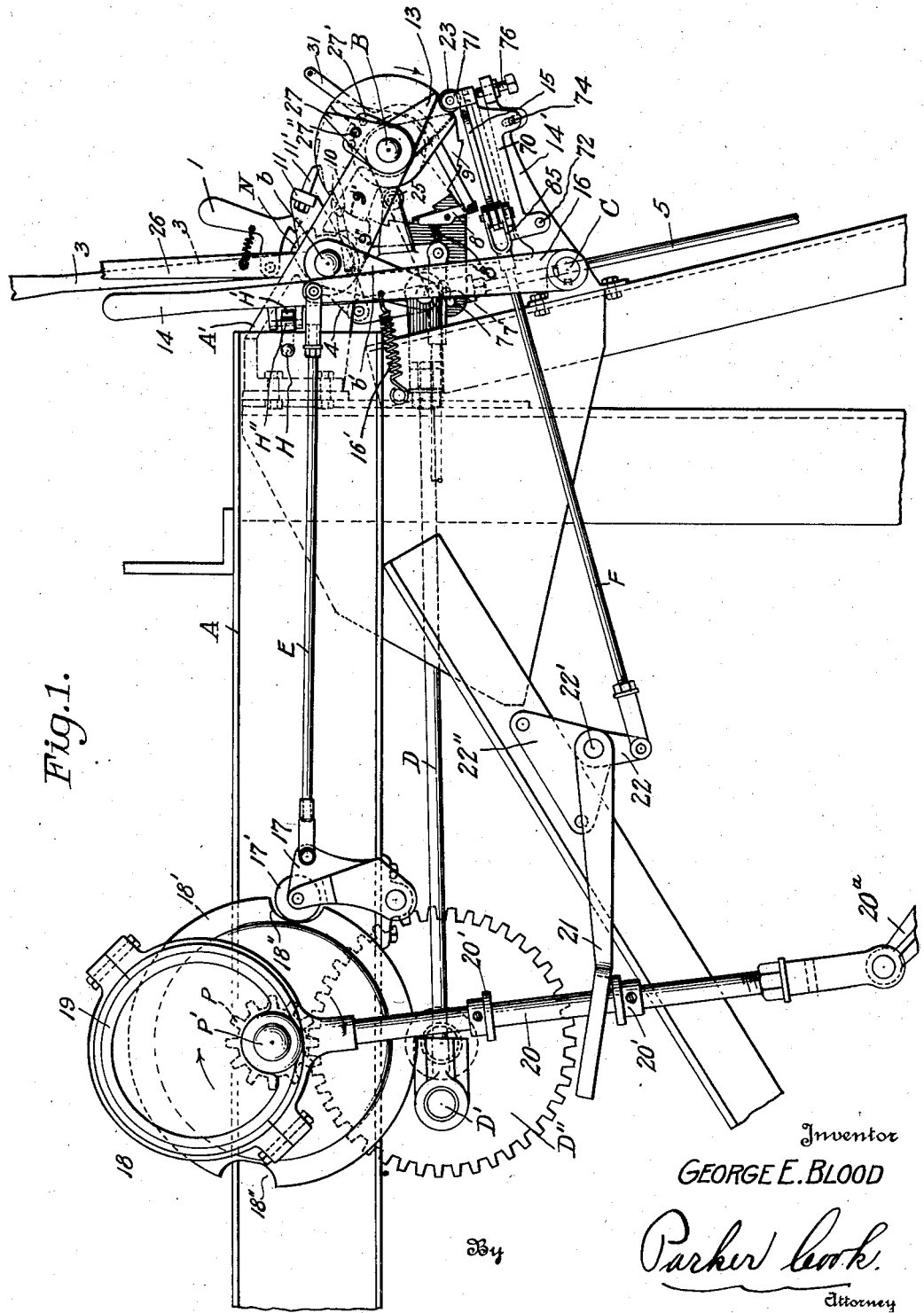

Referring now more specifically to the several views, there is shown in Fig. 1 the several parts of the paver frame A, and although I have not illustrated the complete paver, the parts necessary so far an understanding of the present invention are set forth.

The attachment about to be described is to be used in conjunction with the automatic controls, as shown in the patent granted to Fred L. Dake, patented November 4, 1930, and bearing Patent Number 1,780,869.

In that patent, there is shown a shaft, which is caused to continuously oscillate, means also being shown whereby the manually-operated handles may be temporarily connected with the oscillating shaft, so that the handles are thus mechanically moved by the oscillating shaft, rather than being manually operated.

The control mechanism about to be described utilizes this form of mechanically operating the skip hoist handle, as well as having it capable of manual operation.

It will also be understood that in the present application, I have only shown as much of the paver as is thought necessary to illustrate the present invention, and to show the cooperation of their several parts.

The form of planetary power-operated discharge mechanism is shown in the patent to Charles E. Foote, Number 1,561,144, heretofore mentioned; and in the present instance this form of planetary operating mechanism is connected to the chute in the same manner, except that the planetaries are located directly over the chute, rather than to one side thereof.

To a part of the paver frame A, there is shown bolted the two brackets A′, which in turn support the oscillating shaft b on the end of which is the crank b′, which in turn is connected by the pitman rod D, which latter is connected as at D′ to the driving gear D″. This gear is rotated at all times by the pinion P mounted on a power shaft P′. Thus, it will be seen that the shaft b is oscillating at all times that the power shaft is revolving.

I have not shown the means for driving the power shaft P′, but it will be understood that the engine for the paver will be connected with and drive this shaft.

This oscillating shaft b with its various connections to the control levers is fully illustrated in Patent Number 1,780,869 above mentioned, and granted to Fred L. Dake.

Now rigidly mounted on the oscillating shaft b is a notched member N, so that the small handle 1 mounted on the skip hoist control lever 3 may be hooked into the notched member when it is desired to mechanically operate the handle 3 through the oscillation of the shaft b.

As will be noticed, the skip hoist control lever 3 is freely mounted on the shaft b and is provided at its lower end with the stub arm 4, to which in turn is fastened the bifurcated end 6 of the skip hoist control rod 5.

I have not shown the skip nor skip hoist on which the skip cable is wound, but it will be understood that when the lever 3 is pulled outwardly, either by hand or by dropping the handle 1 into the notched member N, the skip hoist rod 5 will be in turn lifted upwardly, which will cause the hoist (not shown) to elevate the skip.

Thus it will be seen that the skip hoist lever 3 may be pulled to operate the skip rod 5, or the small handle 1 may be preferably operated so that the oscillating of the shaft b, the notched member N engaging with the handle 1 thereon, will transmit the movement of the oscillating shaft b to pull the skip hoist control rod to in turn elevate the skip.

Now it is desirable to automatically control the flow of water from a measuring tank shortly to be described, and to automatically control the power discharge mechanism and the parts about to be described provide this automatic control.

That is, when the control of the skip hoist is actuated to thus start the skip in its upward movement, an automatic cycle of operation will be started, whereby the power discharge will be operated, to thus automatically discharge the batch from the drum, and, as the skip is about to deposit its new load into the drum, the power discharge will be closed and the water will be automatically discharged from a tank into the mixing drum of the paver.

*Starting and operation of timing shaft*

I automatically accomplish this by setting into operation a timing shaft, which is set in motion by the initial operation of the skip hoist control lever, after which the movement of the timing mechanism and its control parts is continuous for a complete cycle of operation.

At the outer end of the heretofore mentioned brackets A', there is supported the main timing shaft B, on which is mounted the ratchet 9, which ratchet is preferably provided with seventeen teeth, so that it will be moved in a step-by-step movement seventeen times for one complete revolution.

Now on this timing shaft B, there is also located an opening cam for the power discharge, a closing cam for the same and a cam for regulating the water supply, all of which will be shortly described.

As will be seen in Figs. 1, 4, 5 and 6, there is provided means for starting the movement of the timing shaft B, which occurs when the skip control hoist lever 3 is operated to start the skip in its upward movement.

The mechanism for starting the movement of the timing shaft B is performed through an arm 7, which is loosely mounted at its one end on the shaft B and slottedly connected by the pin 7' to the bifurcated end 6 of the skip hoist control rod 5.

On this arm 7 there is the starter pawl 8, which is pressed by the spring 8', which pawl normally is held directly under one of the teeth in the ratchet wheel 9. From the rear end of the starter pawl 8 extends the lever 31, which extends through the outer slotted shield 31'. This lever is provided with a small notch 31'' that may be hooked within the shield, if it is desired to keep the pawl 8 out of engagement with the ratchet wheel.

Now when this lever 31 is operated to disengage the pawl from the ratchet wheel, the entire automatic mechanism is thrown out of operation, which will be explained as the specification proceeds.

It will be seen as far as described, that when the skip hoist control rod 5 is thus initially operated from the movement of the handle 3 to start the skip in its upward movement, the starter pawl 8 will move the ratchet wheel 9 upwardly one tooth, so that the driving pawl about to be described will engage the driving teeth to continue the driving of the ratchet wheel 9 to thus step-by-step revolve the timing shaft B, which operates the various timing cams about to be described.

It will be remembered that the handle 3 is loosely mounted on the shaft b, but that the notched member N is pinned thereto, and it will also be remembered that when the skip hoist handle 3 is operated, it moves the arm 7 to in turn move the ratchet wheel 9 one tooth.

Now to cause the step-by-step movement of this ratchet wheel 9, I have provided the driving pawl 10, which in turn is pivotally mounted in the slotted collar 10', as may be seen in Figs. 4 and 5.

It is to be noticed that the ratchet wheel 9 has the one blank space 9' on its periphery, on which normally rests the end of the pawl 10, so that until the arm 7 is raised to in turn force the ratchet wheel 9 upwardly one notch to the adjacent tooth 9'', the pawl 10 will continue to simply ride on this blank on the ratchet wheel, and not move the ratchet wheel 9. However, when the skip hoist handle 3 is moved, either manually or by locking the handle 1 on the notch member, the raising of the arm 7 with its pawl 8 will move the ratchet wheel upwardly one tooth, so that now the pawl 10 will engage the tooth 9'', that is, the tooth just below the blank, while the continued oscillation of the shaft b and its pawl 10 will move the ratchet wheel around seventeen times in a step-by-step movement until the pawl 10 will again come to rest opposite the blank 9' on the ratchet wheel, where it will remain until the skip hoist handle 3 is again operated, to in turn raise the arm 7 and let the starter pawl 8 again start the automatic cycle by placing a tooth in position for the pawl 10.

Adjacent the collar and loosely mounted on the shaft b is the overhanging arm 11, from which extends the locking pawl 11' to engage the ratchet teeth of the ratchet wheel 9 to prevent any rearward movement or back lash in the said ratchet.

Thus it will be seen that on an initial movement of the skip hoist control lever, the automatic timing shaft will be moved in a step-by-step movement for one complete revolution, on which shaft the cams, about to be described, are mounted, thus causing the operation of the power discharge and the turning on and off of the water supply.

It will be noticed in Figs. 4 and 6 that I have also provided means for preventing any forward slip of the ratchet wheel 9, as well as back lash, and I accomplish this by drilling a row of small cavities 12, spaced slightly inward from the periphery of the ratchet wheel, into which will snap the small lug 12', which is carried in the barrel 121, in which barrel is the spring 122, the barrel in turn being mounted in the small lug 123 on the outer end of one of the brackets A'. As the ratchet wheel is moved one notch at a time, the little plunger or lug 12' will center in one of the small circular cavities 12, to thus prevent any forward slip in the ratchet wheel, due to any vibration or jar of the paver or its parts.

It will be understood that this arrangement centers the ratchet wheel and lets it move forwardly in its regular step-by-step movement, but on the other hand prevents any forward slip which, if it occurred, would throw out the timing arrangement of the various cams, about to be described.

At this point, the skip (not shown) will be travelling in its upward direction to discharge the aggregates into the drum of the paver (not shown) and the timing shaft B will be in its step-by-step motion.

Having described how the skip control lever is operated to elevate the skip, and having explained how the timing shaft is set into operation by its starter pawl on the operation of the arm carrying the starter pawl, and having explained how the timing shaft is rotated in a step-by-step movement to make one complete revolution, the means controlled by this timing shaft for opening and closing the power discharge will now be explained.

*Automatic opening and closing cams of the power discharge*

Figure 2:
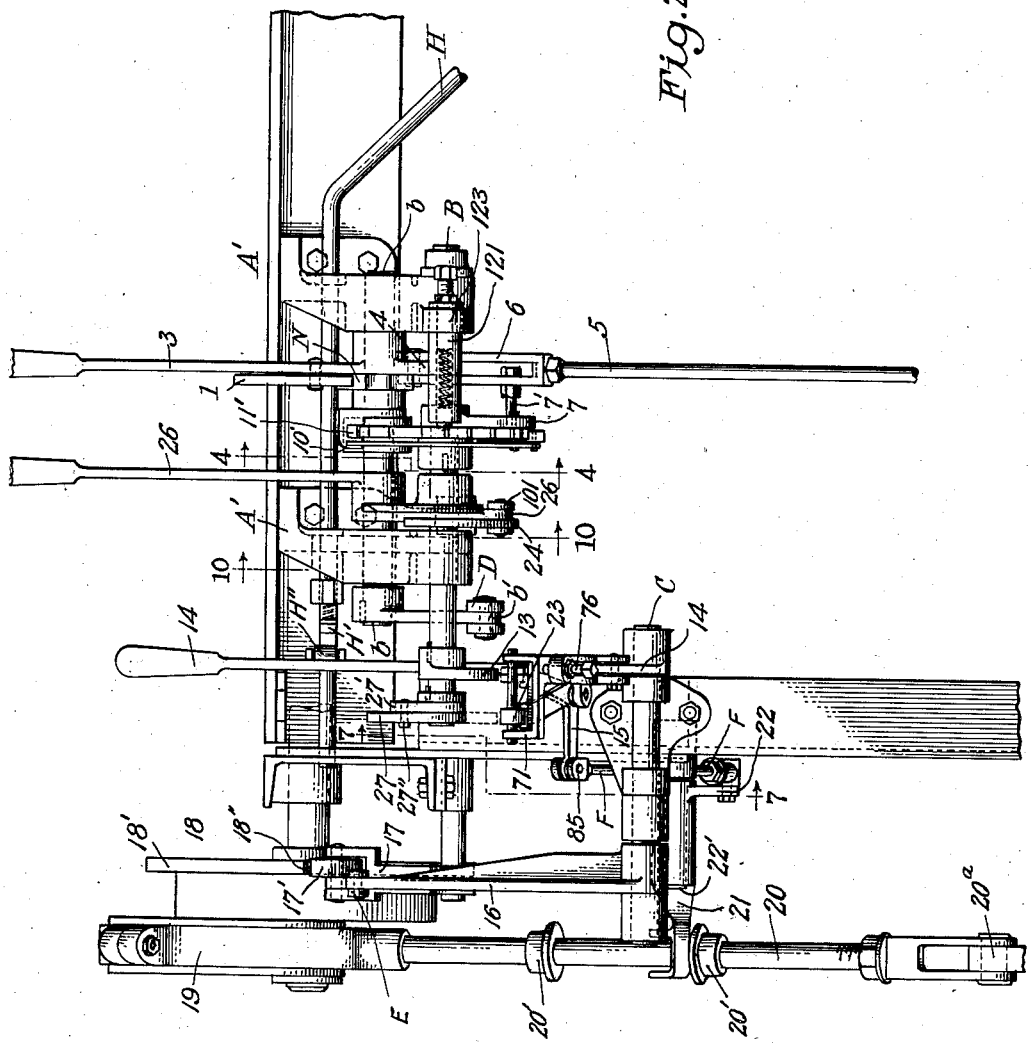

Referring for the moment to Figs. 1, 2 and 7, it will be noticed that there is mounted on the timing shaft B the discharge cam 13, which is keyed to the shaft B, which will be hereinafter called the opening cam, as it operates the parts that cause the chute (planetary discharge) to open, so that the material in the drum may be discharged. It will be noticed that the cam is positioned directly over the arm 14', being a part of the lever 14, which is the lever for controlling the power-operated planetary discharge control mechanism 18, whose operation will be shortly mentioned.

Also mounted on the timing shaft B is the further adjustable cam 27, which will hereinafter be termed the closing cam, as this is the cam that causes the parts of the planetary discharge to operate to close the chute, so that the aggregates will be held in the drum for mixing.

It will be noticed that the closing cam is adjustably mounted on the shaft B, but is adjacent to a plate 27' that is fixedly mounted on the shaft, the plate being provided with three holes so that a pin 27" may lock the cam to the plate in any one of three positions.

In other words, the cam 27 may be adjusted slightly forwardly or rearwardly of the position shown in Fig. 1, so that after the power discharge is opened by the operation of the cam 13, the closing cam 27 may be regulated to again close the same at, say, an interval of seven, nine or eleven seconds, depending on whether the cam is advanced or retracted from the position shown in Fig. 1.

*Planetary power discharge and control parts operated by the opening and closing cams*

Having described the opening and closing cams, the parts that these cams operate will now be set forth.

As heretofore mentioned, these cams 13 and 27 are located directly above the arm 14', which is a part of the discharge control lever 14, which lever is mounted in a small bracket on the stub shaft C. Further keyed to the stub shaft C is the arm 16, to the upper end of which in turn is connected the rod E to which is secured the small plate 17, which carries the roller 17'.

This roller is adapted to engage a casing 18' of the planetary discharge mechanism 18, and it is to be understood that when the roller is in a depression 18", the eccentric, which is a part of the planetary mechanism, is held from movement, but when the roller 17 is pulled without one of the notches, the eccentric of the power discharge is operated, and the discharge chute connected to the eccentric will be opened or closed on each 180 degrees travel of the eccentric and casing 18'.

Figure 3:
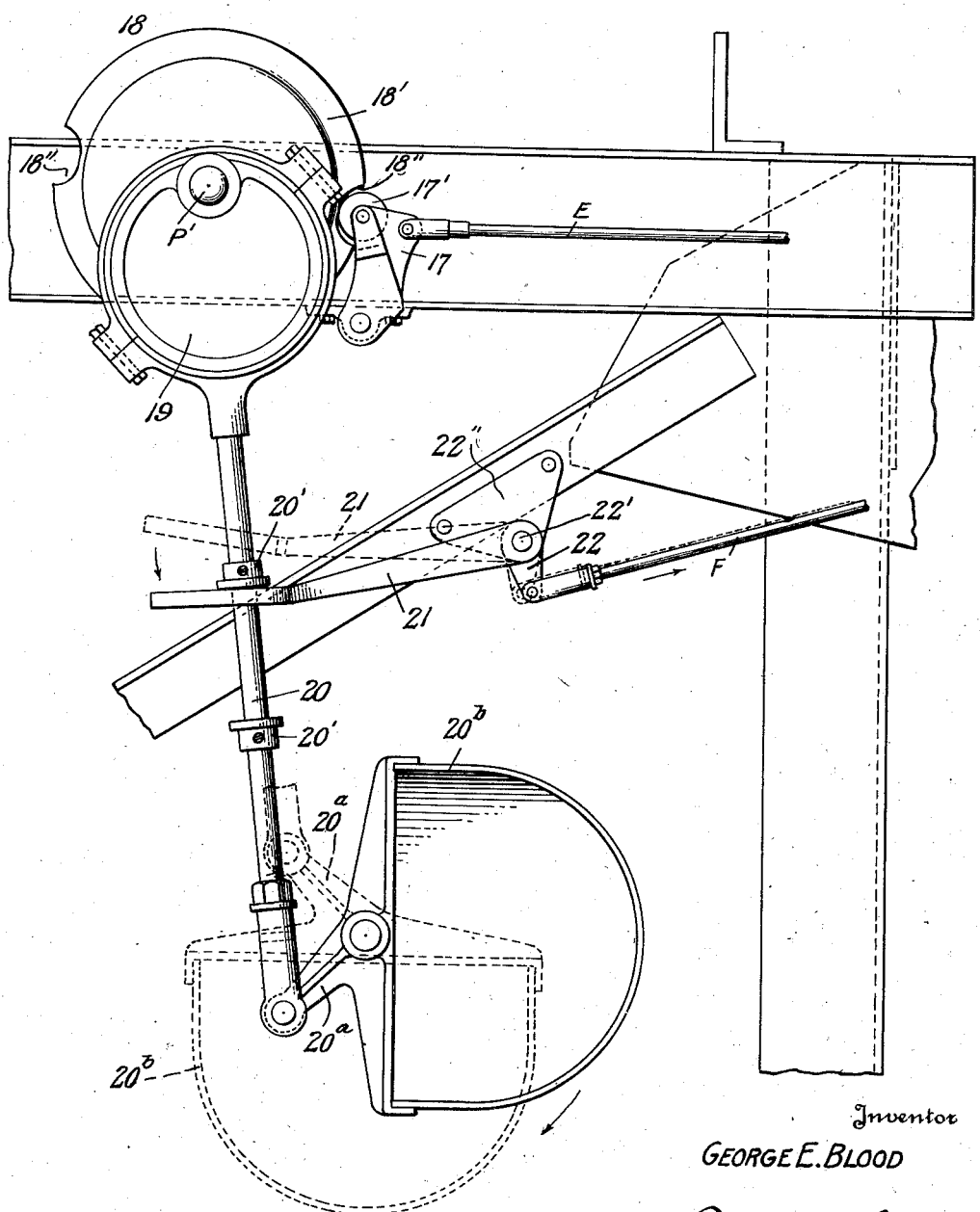
Fig. 3 is a fragmentary view of a part of the power operated discharge mechanism shown as connected to the discharge chute, its operating parts being in their closed or non-discharging position (the timing mechanism would be in its full line position, as shown in Fig. 1), some of the parts being omitted for the sake of clearness of illustration.

Briefly, the planetary discharge mechanism consists of the casing 18', with its diametrically opposite depressions 18", while connected therewith is the eccentric 19, from which in turn extends the rod 20. The lower end of the rod 20 is connected to an arm 20a, which is a part of the trough or discharge chute 20b. When the eccentric is in its upper position, as shown in Fig. 1, it will be understood that the discharge chute is in its open position. This position is also shown in Fig. 3 in dotted lines. When the eccentric is in its lowermost position, as shown in full lines in Fig. 3, the chute has revolved to its closed position, so that the aggregates cannot pass out the chute from the drum (not shown).

Thus, if the discharge control handle 14 is pulled towards the operator, shaft C in turn will be partly rotated, and through the arm 16, and rod E, the roller 17 will be pulled from the casing 18', and the eccentric travel through up or down to open or close the discharge chute, depending upon whether the eccentric was in its upper or lowermost position, before the handle is operated.

I have not shown the brake band or the arrangement of the planetary gears or the means for driving the same in this application, but they are all clearly shown in the above mentioned patent to Charles E. Foote.

The normal position of the discharge control handle 14 is shown in Fig. 1, and it will be understood that the roller 17 will drop in the diametrically opposite depression in the casing, when the casing and eccentric have made a half revolution, and the power operated discharge opened or closed, as the case may be.

As also may be seen in Fig. 1, I have shown a small spring 16' that is attached to the arm 16, which normally holds the arm 16 inwardly, and, of course, the rod E inwardly, so that the roller 17' will normally rest in one of the depressions in the casing 18'. It will also be understood that, if desired, rather than using a spring, the arm 16 and its various connections might be so positioned that the weight of the arms, or, in other words, the center of gravity might be such that the roller 17' would normally fall within one of the cavities in the cut-out portion of the casing 18', and thus do away with the spring.

*Resetting means for power discharge control*

Now to provide means for the positioning of the roller 23, so that the roller and the discharge lever will be depressed if the planetary is closed on the starting of the skip, and to provide means for the reshifting or resetting of the roller after it has been struck by the closing cam 27, there is illustrated the following mechanism:

Referring for the moment to Figs. 1, 7, 8 and 9, there will be seen mounted on the extension 14' of the discharge lever 14, the saddle-shaped member 70, having the head 71, in which is to be mounted the shiftable roller 23, which is, as heretofore mentioned, to be depressed by the cam 13 or by the cam 27, depending upon the position the roller happens to be in, which, of course, is dependent upon whether the planetary discharge is open or closed.

This saddle-shaped member 70 is pivotally bolted to the arm 14', as at 72, and slottedly mounted as at 73, there being shown a small pin 74, which will extend through the opposite ears of the member and through an opening provided in the registering ear 75 of the extension 14'.

This form of connection shown allows for a slight vertical adjustment of the member 70 with regard to the extension arm 14'. There is also shown an adjusting screw 76 at the outer end of the extension 14' for adjusting and holding the member in its adjusted position.

As may be seen in Fig. 7, there is a small rib 78 formed in the cross head 71 of the saddle member 70, so that the bell crank, about to be mentioned, may rest on this rib and thus be prevented from sagging.

It will be noticed that by providing a pivotal saddle member 70 mounted on the extension arm 14' and the adjusting means 76, the roller 23 may be slightly adjusted with relation to the striking noses of the cams 13 and 27, heretofore mentioned.

Now mounted on the lug 80 is the bell crank lever 15, which has the one arm 81 bifurcated at its end as at 82 to form the forked ends to in turn straddle the aforementioned roller 23, while the other arm 84 of the lever 15 is pinned to the clevis 85 on the end of the rod F. This rod (see Fig. 1) is connected to the small stem 22, which is mounted on the stub shaft 22', supported in the bracket 22''.

Also extending from this sleeve 22 is the integral forked arm 21, which straddles the eccentric rod 20, which, it will be remembered, is a part of the planetary discharge mechanism.

Now there is mounted on this eccentric rod 20 the collars 20', one of which is located above the forked arm 21, and one of which is positioned below this arm.

In Fig. 3 in the dotted lines, I have shown the arm 21 in its raised position and also the position the rod F will occupy when the bell crank 15 is in its shifted or dotted line position as shown in Fig. 8. It will be remembered that the rod F is connected to the bell crank lever 15 heretofore mentioned, which in turn shifts the roller 23 in its cross head 71, so that it will be positioned either in the path of the opening cam 13 or the path of the closing cam 27.

*Operation of the automatic opening and closing of the planetary power discharge*

Now assume that the planetary discharge (chute) is closed as shown in Fig. 3. The eccentric rod 20 will be in its lowermost position, and the forked arm 21 will be just below and adjacent the upper striking collar 20'.

Also assume that the opening cam 13 is in a position as shown in Fig. 1. Then on the starting of the automatic timing mechanism, as heretofore explained, by the moving of the skip hoist control lever and its arm 7 and starting pawl 8, as soon as the opening cam 13 strikes against the roller 23, which is in its full line position, as shown in Fig. 8, it will move the extension arm 14' downwardly and through the arm 16, and the arm E will withdraw the roller 17' from its depression 18'' in the casing 18', while the planetary driving mechanism (not shown) will cause the eccentric to move upwardly and the eccentric rod 20, of course, as shown in Fig. 1, to throw the chute to its open position.

The eccentric rod 20 from the chute, in rising will cause the lower collar to carry the arm 21 upwardly to the full line position shown in Fig. 1, and dotted line position as shown in Fig. 3. The arm 21 in moving upwardly has pulled on the rod F and on the bell crank lever 15, and shifted the same to the dotted line position shown in Fig. 8, the discharge chute now being open.

As the ratchet 9 continues in its forward step-by-step movement, it moves the closing cam 27, and after the closing cam has traveled down to a point just above the roller 23, a timed interval of seven, nine or eleven seconds has intervened, all of which time, it will be remembered, the discharge chute is open.

Now the roller being in the dotted line position shown in Fig. 8, will be struck by the closing cam 27. This performs two functions. It forces the extension arm 14' downwardly, which in turn through the arm 16 and the rod E will again release the cam roller 17' from the planetary discharge casing 18' and allow the planetary mechanism to revolve to the position as shown in Fig. 3 to thus close the chute.

Also, the eccentric rod 20 in lowering has caused the upper collar 20' to strike the arm 21, as shown in Fig. 3, and moved the same from the dotted line position to the full line position, which in turn moves the arm F upwardly to thus shift the bell crank lever 15 from its dotted line position to the full line position, as shown in Fig. 8, or, in other words, reset the roller 23, which will now be in a position to again be struck by the opening cam 13, when the next automatic cycle is started.

Thus it will be seen that should the planetary discharge chute happen to be open when the automatic cycle is started by the operation of the skip control levers 1 or 3, the eccentric being in a position as shown in Fig. 1, the cam 13 will not strike the roller 23, because the roller will be over in its dotted line position, and the discharge chute will have already been opened.

However, as soon as the closing cam 27 comes over the roller 23, it will contact with the same and force the arm 14' downwardly, which in turn allows the planetary mechanism to operate, and at the same time will operate the bell crank lever to re-position the roller to be struck by the opening or the discharge cam 13, when the skip control lever is again operated to elevate the skip and again start the automatic cycle in operation.

*Automatic water control*

Having thus described how on the operation of the skip hoist control lever to elevate the skip, the automatic timing mechanism is thrown into operation to start the opening and closing of the discharge chute, and for providing a timed interval between these operations, the timing mechanism for the control of the water will be set forth.

Referring for the moment to Figs. 14, 15 and 16, there is shown a water tank 90 with its operating and control mechanism, which tank is fully described and illustrated in the co-pending application filed by me on the 17th day of May, 1930, and bearing Serial Number 453,282.

In the present application, therefore, only so much of the tank and its valves and operating mechanism is shown as is necessary to explain their cooperation with the automatic timing mechanism that forms a part of the present invention.

The tank 90 has a discharge valve 91 that leads directly to the drum of the paver, (not shown) and is also provided with the supply or replenishing valve 92.

The respective stems 93 and 94 are connected to the lever 95, which lever is operated by the rod 96, which latter is connected to the upper end of the stub arm 97. This stub arm 97 is pivoted at 98 and is in turn operated by the rod 99 that extends to one arm of the bell crank lever 100, while to the other arm of this bell crank is the connecting rod 101, which in turn is connected to the lower end of the water control lever 26 heretofore mentioned.

There is also a spring 99' that is connected to the free end of the rod 99 to normally pull the rod 99 towards the tank, and to hold the valves in the position shown in Fig. 14. In Fig. 15 the supply or replenishing valve 92 is shown in its closed position.

As aforementioned, the above tank is fully explained in the co-pending application, and only a word or two of its operation is thought necessary in the present case, to understand that when the replenishing valve 92 is open, the water from its source will flow into the tank 90. Also the discharge valve 91 is always closed when the replenishing valve 92 is open, because this tank is to provide a measured amount of water to be let into the drum (not shown). Finally, when the discharge valve 91 is open, the replenishing valve 92 is closed, so that there is no possibility of a greater amount of water being supplied to the drum than desired.

Referring now for the moment to Fig. 10, it will be seen if the lever 26 is pulled outwardly at its upper end, the rod 101 will be forced inwardly to in turn, through the bell crank, pull the rod 99 outwardly to thus force the rod 96 downwardly to close the replenishing valve and open the discharge valve from the tank so that the water will be fed from the tank into the drum (not shown).

Now it is desirable to have this water automatically turned on during the elevation of the skip or when the skip nears its upper limit of travel, because at that time the aggregates, of course, will be fed into the drum.

Referring to this automatic timing mechanism for the water, and for the moment to Figs. 1, 2, 10, 11, 12 and 13 inclusively, there will be seen mounted on the timing shaft B the cam plates 24, which are normally positioned as shown in Fig. 10.

These plates are adjustable on the shaft B so that the water supply may be started in proper timed relation with the elevation of the skip and may be adjusted to cut in or cut off the water supply at the desired interval.

As heretofore mentioned, the water supply rod 101 is actuated by the lever 26, which is also mounted on the shaft b and carries in its lower end the small roller 25, which is to be operated by the cam plates just mentioned.

In Fig. 10, the cam plates are shown as adjusted and positioned, so that the water replenishing valve 92 is open and the discharge valve 91 is closed, the cam roller 25 being at what I term its "drop-off" position.

Now when the timing shaft B is revolved in a step-by-step movement, the roller 25 will ride along the face 24' of the cam plates and will force the lower end of the lever 26 inwardly to in turn operate the rod 101, and in so doing it will also move the rod 99 and the rod 96 to shut off the replenishing valve and open the discharge valve. This discharge valve will be held open during the revolution of the cam plates until the cam plate reaches the drop-off point 24", which will in turn allow the spring 99' to pull the rod 99 forwardly and the rod 96 downwardly to thus again open the replenishing valve to the tank and close the discharge valve to the drum.

It will be understood that while the cam face 24' is riding along the face of the roller 25, the skip (not shown) will have been elevating and will have about reached its topmost position, when the outer periphery of the cam plates contact with the roller, so that by the time the replenishing valve is closed and the discharge valve is open, the aggregates will be being fed into the drum, and, at the same time, the water is being fed to the drum, which is the best time, as found by actual practice.

It will also be understood that during this cycle of the cam plates, the tank 90 has discharged its contents into the drum of the mixer, and no more water can be supplied to the mixture in the drum until the discharge valve is again open.

Thus, it will be seen that when the automatic control mechanism is used, not only will the planetary power discharge be controlled, but also the automatic supplying of the water to and from the tank.

Furthermore, if the operator should, for any reason, desire to manually control the flow of water, it may be done by the simple manipulation of the water control lever 26.

In Fig. 1, there is shown the rod H, which is designed to extend to a batchmeter (not shown), this rod H being provided with a latch H' to engage a roller H" on the lever 14, which lever 14, it will be remembered, is the manually-operated lever for controlling the planetary discharge. I have not shown the batchmeter but it will be understood that this discharge lever will be held locked by the batchmeter until the time set for the mixing has been completed, at which time the rod H will be shifted, unlocking the discharge lever H and allowing for its manual or automatic control, as above outlined.

Now, although I have explained the construction and arrangement and operation of the various parts as the specification has proceeded, I will again set out briefly, in the form of a résumé, a cycle of the complete operations.

*Résumé of operation*

Assuming that the skip is in its lowered position, and it is desired to raise the same to empty the aggregates into the mixing drum (not shown). The operator will hook the small handle 1 into the notched member N, which in turn through the oscillating shaft b will cause the skip hoist control rod 5 to be elevated, which in turn will elevate the arm 7 with its starting pawl 8 to move forward the ratchet wheel 9 one notch, or in other words, away from the blank, so that the driving pawl 10 will continue, by the oscillations of the shaft b, the ratchet 9 in its cycle, to make one complete revolution.

Now also assume that the planetary discharge eccentric is in its lower position, (Fig. 3) and the chute 20" is in its closed position, the eccentric rod 20, of course, being in its lowered position. Remembering also that the bell crank lever 15 is in its full line position, as shown in Fig. 8, then as the timing shaft B first moves, the opening cam 13 will be directly over the roller 23.

Now when the opening cam 13 strikes the roller 23, it will force the discharge extension arm 14' of the discharge lever 14 downwardly.

This, through the connecting arm 16 and the rod E, will have pulled the roller 17' from its depression, and allow the casing 18' to have made a one-half revolution and to pull the eccentric of the planetary discharge upwardly from the position shown in Fig. 3 to the position shown in Fig. 1, thus opening the discharge chute.

The eccentric rod 20 in rising also will have lifted the arm 21 upwardly to operate the bell crank lever 15 mounted on the arm 14' to thus shift the roller 23 to its dotted line position, as shown in Fig. 8, to thus be within the path of the approaching closing cam 27.

Now we have the timing mechanism in operation, and the skip elevating.

After an interval of seven or nine seconds, depending on how the closing cam 27 is set, the closing cam will contact with the roller 23 to again lower the extension arm 14' to thus again operate the rod E to withdraw the roller from its depression in the casing in the planetary, and as soon as this occurs, the casing 18 will again make a one-half revolution, forcing the eccentric and its rod 20 downwardly to thus close the discharge chute.

When the discharge chute is closing, the arm 21 will again be lowered to thus operate the bell crank lever 15 to return the roller from its dotted line position in Fig. 8 to its full-line position, so that this roller will now be in a position for being struck on the next cycle by the opening cam 13. At the same time, the batchmeter will lock the discharge handle for the desired timed interval.

As the timing shaft B has revolved, it has also carried the cam plates 24 in their clockwise direction, and will have forced the lower end of the lever 26 inwardly which, in turn, will cut off the replenishing valve to the tank and will have opened the tank discharge valve, so that the tank may empty into the drum of the mixer to furnish the proper supply of water for the aggregates within the drum.

Just before the timing shaft has made a complete revolution, the roller 25 on the control lever 26 will come to the drop-off point of the water control cam plates 24, and the spring will operate the rod 99 to again open the replenishing for the tank and cut off the supply from the tank to the drum, thus completing a cycle of the automatic operation.

The skip will again be lowered or may have been lowered, and the next cycle may be again performed in the same manner.

Now, should it happen that the discharge chute was open on the start of the automatic cycle of operation, the eccentric of the planetary discharge mechanism will be in its raised position, as shown in Fig. 1, and in this instance the roller 23 would be in the dotted line position, as shown in Fig. 8, but as soon as the closing cam 27 has revolved a certain amount, it will strike the roller 23 to thus cause an operation of the planetary discharge mechanism, as has previously been explained, and the automatic mechanism will go through the same cycle as had the discharge chute been closed, the only difference being that the discharge chute will remain open until the closing cam 27 contacts with the roller 23.

Thus it will be seen that the opening and closing of the planetary discharge is wholly automatic with the starting of the skip hoist in operation and, likewise, the supplying of the water into the drum is properly timed with relation to the aggregates being fed into the drum.

It will also be seen that all of the controls may be manually operated as in the past, by simply pulling forwardly the lever 31, and notching the same within the shield 31', which simply disengages the starter pawl from its ratchet 9, which will allow the driving pawl 10 to simply slip forwardly and rearwardly on the blank space 9' formed on the periphery of the ratchet wheel.

However, to throw into operation the automatic control mechanism, it will again only be necessary to shift the lever 31 so that it may assume the position shown in Fig. 4, and on an operation of the small handle 1, again the automatic mechanism will function and the desired automatic cycle continue.

From the foregoing, it will be seen that I have provided an automatic discharge and water control mechanism that may be readily applied to the well-known form of Foote paver, so that it is only necessary for the operator to control the skip hoist and, in turn, the timing mechanism will function to thus control the opening and closing of the discharge and the automatic control of the water.

The mechanism above-described has given excellent service in actual use, and greatly reduces the labor of the operator. Also, the element of throughtlessness or neglect for the opening and closing of the discharge or the forgetting to supply the water at the proper times is done away with.

Finally, it will be seen that the automatic timing mechanism is started coincident with the operating of the mechanism that controls the initial start of the skip hoist, which is the most desirable time for the proper handling and mixing of concrete.

Having thus described my invention, what I claim as new and desire to secure by Letters Patent is:

1. An automatic discharge and water control for concrete pavers, including a skip hoist control lever, an oscillatable shaft, and means for temporarily locking said control lever to the said oscillatable shaft, a timing shaft provided with a ratchet thereon, a pawl carried by the said oscillatable shaft, a blank space on said ratchet and the pawl normally resting on said blank space, a skip hoist rod connected to said lever, an arm mounted on said timing shaft, and extending to said rod, a starter pawl on said arm, whereby an initial movement of said lever will raise the ratchet wheel one tooth to be driven by the pawl on said oscillating shaft, to thereby move the timing shaft and the ratchet through one complete revolution.

2. A ratchet timing mechanism for controlling the discharge of a concrete paver, including an oscillatable shaft, a rotatable timing shaft with opening and closing cams, a ratchet wheel on said shaft provided with one blank space on its periphery, a driving pawl on said oscillatable shaft normally resting on said blank space, an arm having a starter pawl thereon, a skip hoist control lever loosely mounted on said oscillatable shaft and means for temporarily locking the same to said oscillatable shaft, and the arm indirectly connected to said hoist control lever, whereby a movement of said lever will advance the ratchet into cooperation with the driving pawl to thereby drive the ratchet wheel and rotate the timing shaft through one complete revolution.

3. A timing mechanism for controlling the power discharge and water supply of a concrete paver, including an oscillatable shaft, a rotatable timing shaft having a ratchet wheel thereon, provided with one blank space, a skip hoist control rod and lever freely mounted on said oscillatable shaft, and means for temporarily securing the same thereto, starter mechanism connected with the ratchet and with said control rod, whereby an operation of said lever and control rod will move a driving tooth into engagement with the ratchet wheel to thereby move the rotatable shaft through one complete revolution, opening and closing cams for the water control and power discharge on said rotatable shaft, and means for preventing the forward slip of said ratchet wheel and means for preventing the backward slip of said ratchet wheel.

4. An automatic discharge and water control for concrete pavers, including a timing mechanism, opening and closing cams for the discharge included in said mechanism, together with an opening and closing cam for the water discharge, said timing mechanism normally idle, a skip hoist control lever, and a starter mechanism cooperating with said lever to throw said timing mechanism into operative position, means for revolving the timing mechanism in a step-by-step movement for one revolution, means for preventing forward slip of said timing mechanism and means for preventing rearward slip of said timing mechanism.

5. An automatic discharge and water control for concrete pavers, including a timing shaft, having a ratchet wheel thereon, a skip hoist control lever, a starter mechanism connected with said lever, said ratchet wheel being normally inoperative, and an initial movement of the control lever causing said starter mechanism to throw the ratchet wheel into an operative position, means for ratcheting said wheel through a complete revolution, a series of depressions about the perimeter of said ratchet wheel, spring-pressed means to engage said depressions to allow a forward movement of said ratchet wheel in a step-by-step movement, and prevent any forward slip of said ratchet wheel, and further means to prevent the rearward slip of said ratchet wheel, and adjustable cams on said timing shaft adapted to control the power discharge and the water supply.

6. An automatic discharge and water control for concrete pavers, including an automatic timing mechanism, said timing mechanism including a shaft having a ratchet wheel thereon, a blank space on said ratchet wheel, an arm carrying a starter pawl, engaging a tooth of said ratchet wheel, a driving pawl, normally resting on said blank space, means for manually raising said arm to thereby initially move the ratchet wheel one tooth, means to continue the ratchet movement of said wheel through a complete revolution of said ratchet wheel, cams on said timing shaft adapted to control the opening and closing of the discharge, and the control of the water, during a complete revolution of the timing shaft, and means for disengaging the starter pawl from a driving tooth, to thereby render the automatic timing mechanism inoperative even though said arm is raised.

7. An automatic discharge and water control for concrete pavers, including a timing mechanism including a shaft having a ratchet wheel thereon, a blank space on said ratchet wheel, an arm carrying a starter pawl engaging a tooth of said ratchet wheel, a skip hoist control lever connected with said arm, whereby on the operation of the skip hoist control lever said ratchet wheel will be advanced one tooth, means for continuing a step-by-step movement of said ratchet wheel, cams on said shaft adapted to control the opening and closing of the discharge and the control of the water supply, means for disengaging the starter pawl from the ratchet wheel and for holding said pawl locked out of engagement from said ratchet wheel to thereby render the timing mechanism inoperative, even though said starter arm be raised by a movement of said hoist control lever.

8. An automatic discharge and water control for concrete pavers, including a power-operated discharge, a water supply tank, manually-operated controls for the same, a manually-operated skip hoist control lever, automatic control means including a starter pawl connected with said last mentioned control for automatically controlling the power discharge and the water supply from the tank, and means to render the starter pawl inoperative rendering the automatic means inoperative, even though the manually-operated skip hoist control lever be actuated.

9. An automatic power-operated discharge and water control for concrete pavers, including a power-operated discharge, a water supply for the paver, manual means for controlling the power-operated discharge and the water supply, a manually-operated skip hoist control lever, and means for also mechanically operating the same, an automatic timing mechanism including a starter pawl for controlling the manually-operated control means for the power-operated discharge and water supply, the automatic timing mechanism normally actuated by the initial movement of the skip hoist control lever, and means for rendering the starter pawl inoperative, to thus throw the complete timing mechanism also out of control.

10. A concrete paver provided with a planetary power-operated discharge, a manually-operated arm which, when depressed, will control both the opening and closing of said discharge, shiftable means carried by said arm and connected to said power-operated discharge, an opening cam for automatically depressing said shiftable means and said arm to thereby control the opening of the discharge, a closing cam for automatically depressing said shiftable means and said arm to thereby control the closing of said discharge, and the shifting means properly positioned by the opening and closing movement of the planetary discharge to thus be respectively depressed by the said opening and closing cams.

11. A concrete paver provided with a planetary power-operated discharge, an arm which, when depressed, will control both the opening and closing of said discharge, a shiftable striking surface carried by said arm and shiftably operatively connected to said power-operated discharge, an opening cam for automatically depressing said shiftable striking surface and said arm to thereby control the opening of the discharge, a closing cam for automatically depressing said shiftable striking surface and said arm to thereby control the closing of said discharge, and the shiftable striking surface automatically receptively positioned by the opening and closing movement of the planetary discharge.

12. A concrete paver provided with a planetary power-operated discharge, a lever having an extension arm thereon, controls extending from said lever to said power-operated discharge to control the opening and closing of said discharge, a pivotal member carried by said arm, a bell crank on said member, a striking surface shifted by said bell crank lever, control rods extending from the planetary discharge to said bell crank, an opening cam for striking the shiftable surface when it is in one position, and a closing cam for striking the shiftable surface when it is in the other position, to thereby move said arm and lever to in turn control the opening and closing of the power discharge, the opening and closing movement of the power discharge operating said bell crank to thereby respectively locate the position of the shiftable striking surface for the striking action of said cams.

13. A concrete paver provided with a power-operated discharge, a lever having an extension arm thereon, controls extending from said lever to said power-operated discharge, whereby a movement of the lever and arm will control the opening and closing of said discharge, a bell crank carried by said arm and a roller on said arm and shifted by the movement of said bell crank, control rods extending from the said planetary discharge to said bell crank, a revolvable opening cam for striking the roller when in one position to depress said arm to thereby open the discharge, and a closing cam for striking the roller when in its shifted position, to again depress said arm to thereby close the power discharge and the opening and the closing of the discharge operating said bell crank, to thereby properly shift the roller to set the same in its receptive positions to be respectively struck by said cams.

14. A concrete paver provided with a power-operated discharge, said discharge including an eccentric having striking collars thereon, an arm to be operated by said respective collars, a bell crank operated through the movement of said arm, a shiftable roller operated by said bell crank, a lever having an extension arm thereon, carrying said bell crank and roller and connected with the power-operated discharge, whereby a movement of said lever and extension arm will open and close said discharge, a cam for striking the roller when in one position to operate said lever to open the discharge, and an adjustable cam to strike the roller when in its other position to close the power-operated discharge, and the shiftable roller set and reset by the upward and downward movement of the eccentric of the power discharge.

15. An automatic control for concrete pavers, including a planetary discharge, a shiftable roller which, when depressed, controls the power discharge, revolvable cams for striking the shiftable roller to control the opening and closing of the said power discharge, and means operated by the opening and closing movement of the power-operated discharge for properly positioning the shiftable means so as to be struck by the respective opening and closing cams.

16. An automatic control for concrete pavers, including a planetary discharge, a shiftable roller, which, when depressed, controls the planetary discharge, revolvable cams for striking the shiftable roller to control the opening and closing of the said power discharge, the shiftable roller being in its normal position when the discharge is closed and to be operated on by the opening cam, and in its shifted position when the discharge is open and to be operated on by the closing cam, and the movement of the planetary discharge setting and resetting the shiftable roller.

17. An automatic discharge and water control for concrete pavers, including a power-operated discharge and a water supply, a discharge control lever and a shiftable roller thereon, a revolvable opening and closing cam for striking the shiftable roller to control the opening and closing of the said power operated discharge, the shiftable roller being in its normal position when the discharge is closed, and to be operated on by the opening cam, and in its shifted position when the discharge is open and to be operated on by the closing cam, the movement of the power-operated discharge setting and resetting the shiftable roller, and a further cam for turning on the water supply after the power-operated discharge is closed.

18. An automatic discharge and water control for concrete pavers, including a power-operated discharge and water supply, a discharge control member, a shiftable roller on said member, revolvable opening and closing cams for respectively depressing the shiftable roller and member to control the opening and closing of the said power-operated discharge, the shiftable roller being set and reset by the opening and closing movement of the power-operated discharge, a further cam for turning on the water supply after the power-operated discharge is closed and for turning off the water before the power-operated discharge is opened, and means for turning all of said cams through one complete revolution.

19. A concrete paver, including a discharge chute, an eccentric connected to said chute for operating the same, rods for controlling the movement of the eccentric, a shiftable roller cooperating with said rods, and timing means including cams for depressing said roller to regulate the opening and closing of the discharge chute, and means operated by the movement of the eccentric to set and reset the roller in its proper position to be depressed by the movement of said cams.

20. An automatic discharge and water control for concrete pavers, including a manual and automatic control lever for controlling the power discharge, a manual and automatic control lever for controlling the water supply, a skip hoist control lever operably connected with the two former-mentioned levers, whereby an initial movement of the hoist control lever will automatically control the two former-mentioned levers, means including a starter pawl also connected with the skip hoist control lever capable of rendering the automatic mechanism inoperative, whereby the power-operated discharge and the water controls must be manually controlled.

GEORGE E. BLOOD.